United States Patent
Yuan et al.

(10) Patent No.: US 7,149,076 B2
(45) Date of Patent: Dec. 12, 2006

(54) CAPACITOR ANODE FORMED OF METALLIC COLUMNS ON A SUBSTRATE

(75) Inventors: Shi Yuan, West Chester, PA (US); Duan-Fan Wang, Hillsborough, NJ (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/889,434

(22) Filed: Jul. 12, 2004

(65) Prior Publication Data

US 2005/0013092 A1    Jan. 20, 2005

Related U.S. Application Data

(60) Provisional application No. 60/487,426, filed on Jul. 15, 2003.

(51) Int. Cl.
*H01G 9/04* (2006.01)
*H01G 9/145* (2006.01)

(52) U.S. Cl. ..................... 361/528; 361/532
(58) Field of Classification Search ........... 361/523, 361/528–532
See application file for complete search history.

(56) References Cited

U.S. PATENT DOCUMENTS

| | | | |
|---|---|---|---|
| 4,104,704 A * | 8/1978 | Weaver | 361/532 |
| 4,309,810 A | 1/1982 | Drake | |
| 4,960,471 A | 10/1990 | Fife et al. | 148/20.3 |
| 4,970,626 A | 11/1990 | Kakinoki et al. | |
| 5,866,204 A | 2/1999 | Robbie et al. | 427/256 |
| 6,051,326 A | 4/2000 | Fife | 428/610 |
| 6,191,936 B1 * | 2/2001 | Webber et al. | 361/528 |
| 6,206,065 B1 | 3/2001 | Robbie et al. | 156/349 |
| 6,226,173 B1 * | 5/2001 | Welsch et al. | 361/508 |
| 6,231,689 B1 | 5/2001 | Fife | 148/281 |
| 6,248,422 B1 | 6/2001 | Robbie et al. | 428/119 |
| 6,517,645 B1 | 2/2003 | Fife | 148/422 |
| 2002/0045030 A1 | 4/2002 | Ozin et al. | 428/173 |
| 2002/0059897 A1 | 5/2002 | John et al. | 117/84 |
| 2002/0102171 A1 * | 8/2002 | Jurgen et al. | 418/1 |
| 2002/0187312 A1 | 12/2002 | Fonash et al. | 428/195 |
| 2004/0238848 A1 | 12/2004 | Arai | |

FOREIGN PATENT DOCUMENTS

| | | |
|---|---|---|
| EP | 0272926 | 6/1988 |
| JP | 01033917 | 2/1989 |
| WO | WO 02/067278 A2 | 8/2002 |
| WO | WO 03/042425 A1 | 5/2003 |

OTHER PUBLICATIONS

Prof. M. Brett, "GLAD (Glancing Angle Deposition)," from website http://www.ee.ualberta.ca/~brett/glad.html. no date.
Prof. M. Brett, "Glancing Angle Deposition (GLAD) of Structured Thin Film Materials," from website http://www.ee.ualberta.ca/~brett/glad.html. no date.
International Search Report and Written Opinion for PCT/US2004/022463 dated Dec. 2, 2004.

* cited by examiner

*Primary Examiner*—Eric W. Thomas

(57) ABSTRACT

Capacitor anodes that include metallic columns formed on a substrate so as to form a porous microstructure and methods of making the anodes are described. The metallic columns can be distinct from one another and project outward from the substrate. Also described is the formation of the metallic columns on the substrate by vapor deposition, including glancing angle deposition (GLAD), and by etching a portion of a metal layer. High capacitance capacitors made from the capacitor anodes are also described.

53 Claims, 4 Drawing Sheets

CAPACITOR ANODE FORMED OF METALLIC COLUMNS ON A SUBSTRATE

This application claims the benefit under 35 U.S.C. §119 (e) of prior U.S. Provisional Patent Application No. 60/487,426 filed Jul. 15, 2003, which is incorporated in its entirety by reference herein.

BACKGROUND OF THE INVENTION

The present invention relates to high surface area metal material and high capacitance electrolytic capacitors made therefrom. More particularly, the present invention relates to a porous metallic columnar microstructure formed on a substrate, and electrolytic capacitors using the microstructure, as well as methods of making the microstructure and the capacitors.

Electrolytic capacitors, made from metal material, have been a major contributor to the miniaturization of electronic circuits and have made possible the application of such circuits in extreme environments. Metallic capacitors typically are manufactured by compressing metal material, e.g., powder, to form a pellet, sintering the pellet in a furnace to form a porous metallic body (anode), and then subjecting the sintered anode to anodization in a suitable electrolyte to form a continuous dielectric oxide film on the sintered anode. The anode is then immersed in an aqueous solution of manganese nitrate and then heated to produce an anode having a manganese dioxide coating on its surface.

The performance characteristics of capacitors or electrodes formed from capacitor grade materials are expressed in terms of specific charge and electrical current leakage. The specific charge is a measure of electrical charge capacity of the capacitor and is usually proportional to the surface area of the metal material as a sintered and anodized pellet. The electrical leakage is an indication of how well the capacitor holds the specific charge. Capacitors with improved electrical leakage characteristics are recognized as having higher reliability.

Development of metal materials suitable for making metallic capacitors has resulted from efforts by both capacitor producers and metal processors to delineate the characteristics required for metal material to best serve in the production of quality capacitors. Such characteristics include specific surface area, purity, shrinkage, pressability, and the like. With respect to surface area, the metal material should provide an adequate electrode surface area when formed into a porous body and thereafter sintered. The μFV/g of metallic capacitors can be related to the specific surface area of the sintered porous body produced by sintering a metal pellet. The specific surface area of metal material can be related to the maximum μFV/g attainable in the sintered porous body. High sintering temperatures tend to shrink the porous body, thus reducing its net specific surface area and the capacitance of the resulting capacitor. Minimizing the loss of specific surface area under sintering conditions, i.e., shrinkage, is necessary to produce high μFV/g metallic capacitors.

As discussed above, the μFV/g of a metal pellet can be a function of the specific surface area of the sintered metal material. Greater net surface area can be achieved, of course, by increasing the quantity (grams) of metal per pellet; but, cost and size considerations have dictated that development be focused on means to increase the specific area of metal material, that is, to increase volumetric efficiency. Thus, conventional production of metallic capacitor anodes having a given capacitance has required the use of metal powders having specified properties, e.g., a certain surface area, for an entire production lot of anodes.

Accordingly, a need exists for a method to produce a high surface area metal material for use in forming capacitors having high capacitance. Additionally, a need exists for a method of forming an electrolytic capacitor anode without the costs and surface area reduction associated with sintering the metal material. A further need exists for a method of forming a capacitor anode in which the capacitance of the anode can be controlled by varying any one of a number of factors during production of an anode.

SUMMARY OF THE PRESENT INVENTION

It is therefore a feature of the present invention to provide a porous metallic microstructure that can be formed into a capacitor anode having relatively high capacitance.

Another feature of the present invention is to provide a method of making a capacitor anode from metal material without sintering the metal material.

A further feature of the present invention is to provide a method of controlling the capacitance of a capacitor anode by determining the height, width, length, shape, orientation, density, porosity, and the like of metallic columns formed on a substrate used for forming an anode.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a capacitor anode that includes a substrate having metallic columns formed thereon to form a porous microstructure. The metallic columns can be distinct, fiber-like structures that project outward from the substrate, and the columns can be ordered and/or in a random orientation. The metallic columns can be grown on the substrate and/or formed on the substrate by etching certain portions of a metallic layer, optionally using a mask.

The present invention further relates to a method of making an anode that includes forming metallic columns on a substrate, e.g. a metal foil, by vapor metal deposition, including glancing angle deposition.

The present invention also relates to a capacitor that includes an anode having a substrate with metallic columns formed thereon, a dielectric layer on the surface of the anode, a manganese dioxide layer adjacent to the dielectric layer, a graphite layer adjacent to the manganese dioxide layer, an exterior shell in electrical contact with the graphite layer, and conductive contacts fixed to the exterior shell.

It is to be understood that both the foregoing general description and the following detailed description are exemplary and explanatory only and are intended to provide a further explanation of the present invention, as claimed.

The accompanying drawings which are incorporated in and constitute a part of this application, illustrate some of the embodiments of the present invention and together with the description, serve to explain the principles of the present invention.

DETAILED DESCRIPTION OF THE PRESENT INVENTION

Figure 1:
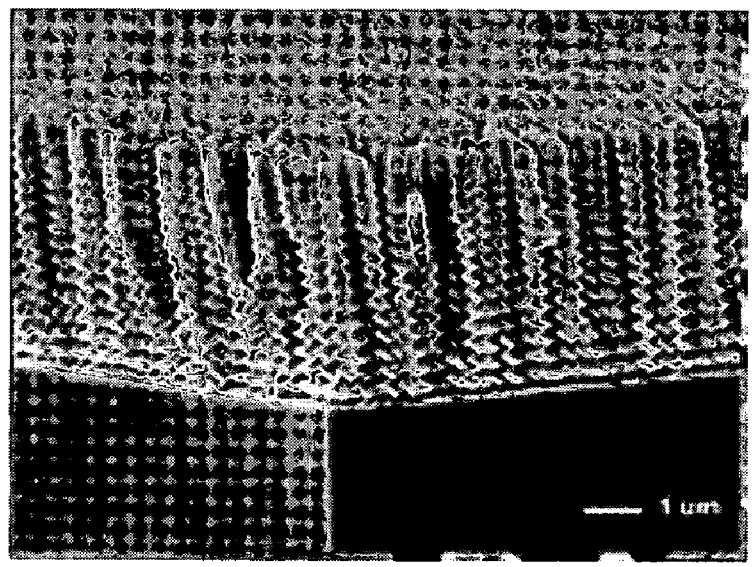
FIGS. 1–8 show SEMs of various shapes of metallic columns formed on a substrate.

A capacitor anode according to the present invention includes a substrate having metallic columns formed thereon to form a porous microstructure. Preferably, the metallic columns are distinct from one another, and project outward from the substrate. The metallic columns can have an ordered orientation and/or a random orientation on the substrate. Optionally, the metallic columns can be formed on the substrate by metal vapor deposition.

The metallic columns can be any metal, and are preferably any metal that is capable of being etched, and/or any column-forming depositable metal. For purposes of the present invention, depositable material is column-forming when it exhibits limited adatom diffusion, and a sufficiently high sticking factor that structures are formed, rather than unformed masses. Preferably, the metal is a valve metal which generally includes tantalum, niobium, and alloys thereof, and also may include metals of groups IVB, VB, and VIB of the Periodic Table of the Elements, and aluminum and copper, and alloys thereof. Valve metals are described, for example, by Diggle, in "Oxides and Oxide Films," Vol. 1, pp. 94–95, 1972, Marcel Dekker, Inc., New York, incorporated in its entirety by reference herein.

The substrate can be any solid material having a deposition surface onto which a metal vapor can be deposited. Preferably, the substrate is a metal, more preferably a valve metal, and most preferably tantalum or niobium. The substrate preferably has a sticking coefficient of at least about 0.9 to enable the formation of well-defined or distinct structures. Preferably, the substrate is made from the same metal as the metallic columns. The substrate can be in a variety of forms, e.g., wire or sheet, including foil, as described, for example, in U.S. Pat. Nos. 6,517,645 B2; 6,231,689 B1; 6,051,326; and 4,960,471. Preferably, the substrate is a metal foil having a thickness of from about 0.1 µm to about 2000 µm, and more preferably from about 10 µm to about 1000 µm. The deposition surface of the substrate can have a surface area of from about 0.1 mm$^2$ to about 100 cm$^2$, and preferably from about 1 mm$^2$ to about 1 cm$^2$. The substrate can include a plurality of substrates, for instance a segmented array or mosaic.

The metallic columns can be formed on the substrate by any method whereby distinct (i.e., separate from one another) columnar structures can be formed on the substrate to form a porous microstructure. For example, the substrate can be exposed to a metal vapor flux in which vaporized metal material is deposited on the substrate. The vapor flux can be generated by any method including sputtering and/or heating of the metal. The metallic columns can be formed on the substrate, for example, by chemical vapor deposition (CVD) and physical vapor deposition (PVD) processes or other metal depositing techniques. Preferably, the metallic columns are formed on the substrate by exposing the substrate to an oblique incident vapor flux in conditions of limited adatom diffusion, and more preferably, by glancing angle deposition (GLAD), as described, for example, in U.S. Pat. Nos. 6,248,422 B1; 6,206,065 B1; and 5,866,204, which are incorporated herein in their entireties by reference. The substrate can have a deposition surface area of from about 0.1 mm$^2$ to about 100 cm$^2$ and preferably is from about 1 mm$^2$ to about 1 cm$^2$. Optionally, the substrate can include a plurality of substrates in the form of an array or matrix, and the substrate can be segmented, e.g., perforated or divided, before, during, or after the formation of metallic columns on its surface. According to one embodiment, after formation of the metallic columns, the substrate can be sub-divided into a plurality of substrates by any method. Preferably, the method of formation of the metallic columns results in a metal microstructure having a high surface area.

The metallic columns are preferably formed on the substrate and are distinct columnar structures that extend or project outward from the deposition surface of the substrate. The metallic columns can be attached to the substrate at a proximal end, extend from there and terminate at an opposing distal end from the substrate, the proximal and terminal ends defining a length of the metallic columns. The distal end can include a cap portion which can be thicker than the metallic column along its length. The width of a metallic column can be constant or it can vary along its length. The metallic column can have an average width of from about 0.001 µm to about 10 µm, and preferably, from about 0.05 µm to about 0.5 µm. The metallic columns can have an aspect ratio of at least 2 to 1, and preferably at least 3 to 1. The height of the metallic columns, i.e., the straight line distance from the deposition surface of the substrate to the distal end of the metallic columns can be from about 0.1 to about 1000 microns, and preferably, the metallic columns have an average height up to about 50 microns, and more preferably up to about 500 microns. The height of the metallic columns can be substantially the same, or can vary one to another. The metallic columns preferably have an average height of from about 1 to about 500 µm, and a width of from about 0.05 to about 0.5 µm. The height of the metallic columns can include multiple layers of metallic columns. That is, metallic columns can be formed on the distal end of existing metallic columns, and so on, to form a continuous stack of layers of metallic columns. Preferably, the length, width, and height of the metallic columns produces a metal microstructure having a high surface area.

Figure 2:
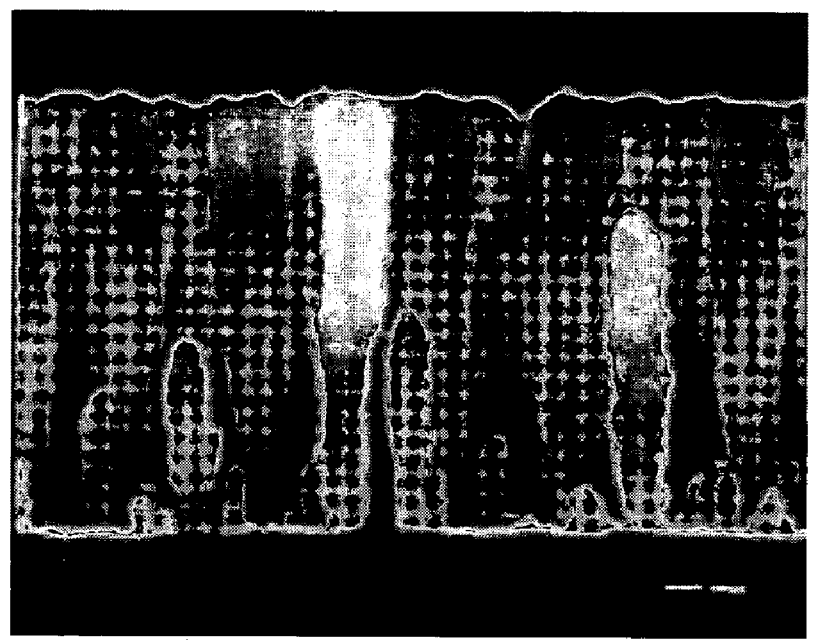
Figure 3:
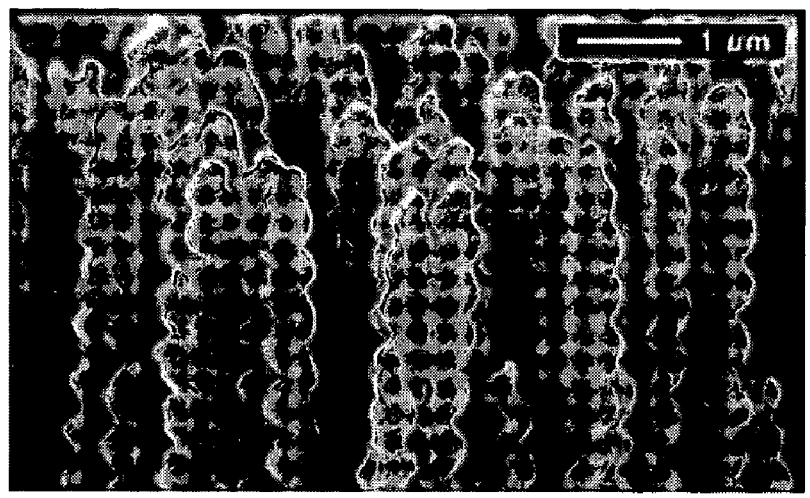
Figure 4:
Figure 5:
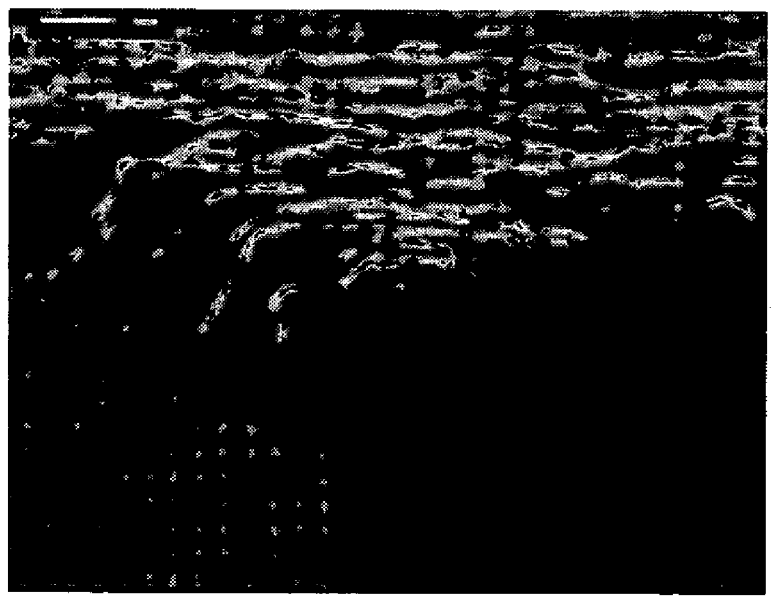
Figure 6:
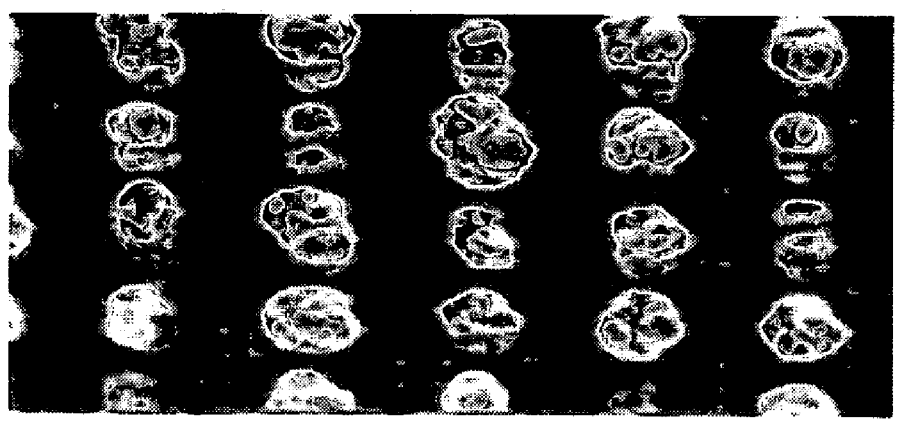
Figure 7:
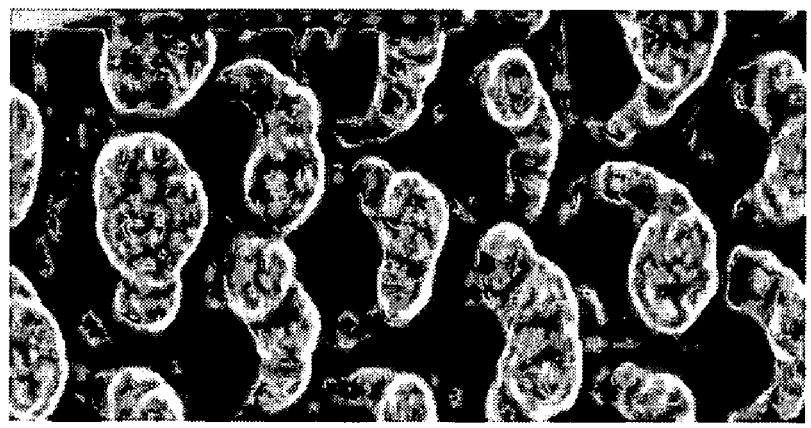
Figure 8:
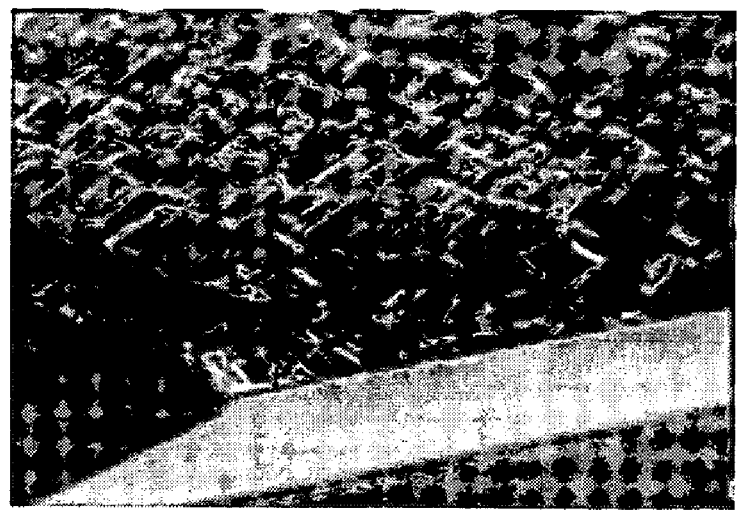

The metallic columns can be formed in an ordered orientation in which the shape, thickness, density, and the like of the columns are substantially uniform. Alternatively, the metallic columns can be formed in a random orientation. The orientation of the metallic column, i.e., axis of orientation, can change along its length so that portions of the column are offset from each other, i.e., the direction of the metallic columns changes one or more times along its length. For example, the column can be formed so that the length of the metallic column is substantially greater than the height of the metallic column. Preferably, the orientation of the metallic columns results in a microstructure having a high surface area. The metallic columns can have any regular or irregular shape. For example, the metallic columns can have a substantially circular cross-section, and/or a substantially helical cross-section. The metallic columns can be slanted, curved, vertical, or other variably shaped columns. The metallic columns can be fibrous or fiber-like. FIGS. 1–8 show examples of various shapes of metallic columns, other shapes are also possible. Preferably, the shape of the metallic columns produces a metal microstructure having a high surface area. The columns can be solid, hollow (e.g., nanotube-like), partially hollow, or combinations thereof. The columns can have any suitable density and/or thickness.

According to one embodiment of the present invention, forming the metallic columns on the substrate includes forming mounds or bases on the deposition surface of the substrate by, for example, micromachining. The bases can be formed at preferred locations to initiate growth of the metallic columns, for example, by GLAD. The bases can have any configuration, including a substantially rectilinear array. The spacing apart of the bases can promote growth of distinct metallic columns. The number of metallic columns per unit area of the deposition surface of the substrate can vary, and can be from about $2.5*10^5$ to about $2.5*10^{13}$ per $cm^2$, for example. The density of the metallic columns can be related to the number and location of the bases formed on the deposition surface of the substrate. The density of the metallic columns can be related to the porosity of the microstructure formed by the metallic columns on the substrate. Preferably, the density of the metallic columns produces a high surface area microstructure.

According to one embodiment of the present invention, the metallic columns are formed on the substrate by etching a metal layer. This etching can optionally be done through or in competition with a mask. The metal layer can be any metal and is preferably a valve metal, and more preferably tantalum or niobium. The metal layer can be any form such as a foil or thin film. The metal can have any dimensions, and is preferably from about 10 µm to about 1000 µm thick. Etching can be achieved by any method to form distinct metallic columns in the metal layer. The metal layer can have a surface area of from about 0.1 $mm^2$ to about 100 $cm^2$, and a thickness of from about 10 µm to about 1000 µm. Etching of the metal layer can be to a depth of from about 0.1 µm to about 1000 µm, and preferably leaves a substrate having a thickness of from about 0.1 µm to about 10 µm, and forms metallic columns having an average height of from about 0.1 µm to about 1000 µm. The density of the metallic columns formed can be substantially as described above. The metallic columns produced by etching can be substantially vertical and/or slanted columnar structures.

The porous metallic microstructure formed from the substrate having the metallic columns formed thereon can have a BET surface area of from about 0.01 to about 200 $m^2/g$, and preferably from about 0.1 to about 20 $m^2/g$, or preferably at least about 0.5 $m^2/g$, and more preferably, at least about 1 $m^2/g$. The BET surface area of the metallic microstructure can be predetermined or controlled by adjusting any one of various dimensions of the metallic columns, independently or in combination. For instance, adjusting or changing the height of the metallic columns can produce otherwise similar metallic microstructures (e.g., column width, density, shape, etc.) that have different surface areas. Control of the BET surface area of the metallic microstructure can provide control of the capacitance of the capacitor anode formed of the metallic microstructure.

The capacitor anode can be formed by any method, for example, as described in U.S. Pat. Nos. 6,527,937 B2; 6,462,934 B2; 6,420,043 B1; 6,375,704 B1; 6,338,816 B1; 6,322,912 B1; 6,616,623; 6,051,044; 5,580,367; 5,448,447; 5,412,533; 5,306,462; 5,245,514; 5,217,526; 5,211,741; 4,805,704; and 4,940,490, all of which are incorporated herein in their entireties by reference. As discussed above, the sintering step of forming the anode can be omitted according to the present invention. According to one embodiment of the present invention, the capacitor anode is used to form a capacitor that further includes a dielectric layer on the surface of the anode. Also, in other embodiments the anode can form a part of an overall capacitor (e.g., solid). A manganese dioxide layer adjacent to the dielectric layer can be present; a graphite layer adjacent to the manganese dioxide layer can be present; and exterior shell and electrical contact with the graphite layer can be present; and conductive contacts fixed to the shell can be present. The capacitor can be formed by any method. It is believed that capacitors made from the capacitor anodes according to the present invention have improved electrical leakage characteristics. The capacitors can have a capacitance of from about 12,500 to about 2,500,000 CV/g, and preferably from about 30,000 to about 1,000,000 CV/g, or from at least about 100,000 CV/g, and preferably from about 200,000 CV/g. As previously discussed, capacitance can be controlled by controlling the dimensions of the metallic columns. The capacitors of the present invention can be used in a variety of end uses such as automotive electronics; cellular phones; computers, such as monitors, motherboards and the like; consumer electronics including televisions and CRTs; printers/copiers; power supplies; modems; computer notebooks; and disc drives.

The present invention has many advantages, including that, unlike the various possible shapes of powders, e.g., angular, nodular, fibrous, flake, and the like, the metallic columns and the resultant microstructures can be formed into limitless, complex and intricate shapes, thus providing an anode producer with much more control over the surface area of the microstructure used in forming the anode. Consequently, volumetric efficiency can be maximized, and the capacitance of the capacitors controlled to a greater degree. Furthermore, shrinkage due to densification is avoided by eliminating the sintering step altogether.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A capacitor anode comprising a substrate having metallic columns thereon to form a porous microstructure, wherein said metallic columns have a substantially helical cross-section.

2. The capacitor anode of claim 1, wherein said metallic columns are distinct from one another, and wherein said metallic columns project outward from said substrate.

3. The capacitor anode of claim 1, wherein said metallic columns comprise an ordered orientation.

4. The capacitor anode of claim 1, wherein said metallic columns comprise a random orientation.

5. The capacitor anode of claim 1, wherein said metallic columns have a width of at least about 0.001 microns.

6. The capacitor anode of claim 1, wherein said metallic columns have a width of from about 0.05 to about 0.5 microns.

7. The capacitor anode of claim 1, wherein said metallic columns have a height of at least about 0.1 microns.

8. The capacitor anode of claim 1, wherein said metallic columns have a height of from about 0.1 to about 2000 microns.

9. The capacitor anode of claim 1, wherein said metallic columns have a height of from about 0.1 to about 2000 microns, and a width of from about 0.05 to about 0.5 microns.

10. The capacitor anode of claim 1, wherein said metallic columns have an aspect ratio of at-least 2 to 1.

11. The capacitor anode of claim 1, wherein said metallic columns have an angular orientation relative to said substrate.

12. The capacitor anode of claim 1, wherein said substrate is a valve metal foil.

13. The capacitor anode of claim 1, wherein said substrate comprises a foil.

14. The capacitor anode of claim 1, wherein said substrate comprises a tantalum foil.

15. The capacitor anode of claim 1, wherein said metallic columns are solid.

16. The capacitor anode of claim 1, wherein said metallic columns are hollow.

17. The capacitor anode of claim 1, wherein said metallic columns comprise a valve metal.

18. The capacitor anode of claim 1, wherein said metallic columns comprise a valve metal, and wherein said substrate comprises valve metal.

19. The capacitor anode of claim 1, wherein said porous microstructure has a BET surface area of at least 0.1 $m^2/g$.

20. The capacitor anode of claim 1, wherein said porous microstructure has a BET surface area of from about 1 to about 20 $m^2/g$.

21. The capacitor anode of claim 1, wherein said anode has a capacitance of at least 12,500 CV/g.

22. The capacitor anode of claim 1, wherein said anode has a capacitance of from about 12,500 to about 2,000,000 CV/g.

23. A capacitor comprising the anode of claim 1.

24. The capacitor of claim 23, further comprising:
a dielectric layer on a surface of said anode;
a manganese dioxide layer adjacent to said dielectric layer;
a graphite layer adjacent to said manganese dioxide layer;
an exterior shell in electrical contact with said graphite layer; and
conductive contacts fixed to said exterior shell.

25. A method of making the capacitor anode of claim 1, comprising:
forming said metallic columns on a said substrate; and
forming a dielectric layer over said metallic columns and said substrate to form a porous microstructure.

26. The method of claim 25, farther comprising forming bases on said substrate at predetermined locations, wherein said metallic columns are formed on said bases.

27. The method of claim 25, wherein said metallic columns are distinct from one another, and wherein said metallic columns project outward from said substrate.

28. The method of claim 25, wherein said metallic columns are formed as an ordered orientation.

29. The method of claim 25, wherein said metallic columns are formed as a random orientation.

30. The method of claim 25, wherein said metallic columns are formed by depositing vaporized metal on said substrate.

31. The method of claim 25, wherein said metallic columns comprise a valve metal.

32. The method of claim 25, wherein said metallic columns comprise niobium or tantalum.

33. The method of claim 25, wherein said metallic columns are formed on said substrate by glancing angle deposition.

34. The method of claim 25, wherein said substrate is a valve metal foil.

35. The method of claim 25, wherein said substrate comprises a foil.

36. The method of claim 25, wherein said substrate comprises a tantalum foil.

37. The method of claim 25, wherein said substrate comprises a mosaic.

38. The method of claim 25, further comprising dividing said substrate into a plurality of substrates.

39. The method of claim 25, wherein said metallic columns are formed to a width of up to about 10 microns.

40. The method of claim 25, wherein said metallic columns are formed to a width of from about 0.001 to about 10 microns.

41. The method of claim 25, wherein said metallic columns are formed to a height up to about 1000 microns.

42. The method of claim 25, wherein said metallic columns are formed on said substrate by etching a metallic layer optionally through a mask.

43. The method of claim 25, wherein said metallic columns are formed to a height of from about 1 to about 500 microns.

44. The method of claim 25, wherein said metallic columns have an aspect ratio of at least 2 to 1.

45. The method of claim 25, wherein said metallic columns are formed to a height of from about 1 to about 1000 microns, and a width of from about 0.01 to about 10 microns.

46. The method of claim 25, wherein said metallic columns have an angular orientation relative to said substrate.

47. The method of claim 25, wherein said porous microstructure has a BET surface area of at least 0.1 $m^2/g$.

48. The method of claim 25, wherein said porous microstructure has a BET surface area of from about 0.1 to about 20 $m^2/g$.

49. The method of claim 25, wherein said anode has a capacitance of at least 12,500 CV/g.

50. The method of claim 25, wherein said anode has a capacitance of from about 12,500 to about 2,000,000 CV/g.

51. The method of claim 25, wherein said metallic columns are formed on said substrate by glancing angle deposition.

52. The method of claim 25, wherein said metallic columns are formed on said substrate by physical vapor deposition or chemical vapor deposition.

53. The method of claim 25, wherein said metallic columns are formed on said substrate by sputtering.

* * * * *